(12) United States Patent
Rander et al.

(10) Patent No.: US 10,810,883 B1
(45) Date of Patent: Oct. 20, 2020

(54) TRAVEL TIME ESTIMATION (71) Applicant: Uber Technologies, Inc., San Francisco, CA (US)

(72) Inventors: Peter Rander, Pittsburgh, PA (US); Anthony Stentz, Pittsburgh, PA (US); Bryan Nagy, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 140 days.

(21) Appl. No.: 15/610,068

(22) Filed: May 31, 2017

Related U.S. Application Data (60) Provisional application No. 62/345,289, filed on Jun. 3, 2016.

(51) Int. Cl.
| | |
|---|---|
| *G08G 1/00* | (2006.01) |
| *G05D 1/00* | (2006.01) |
| *G08G 1/02* | (2006.01) |
| *G01C 21/34* | (2006.01) |
| *G01S 19/14* | (2010.01) |
| *G08G 1/01* | (2006.01) |

(52) U.S. Cl.
CPC ......... *G08G 1/202* (2013.01); *G01C 21/3438* (2013.01); *G05D 1/0088* (2013.01); *G08G 1/0112* (2013.01); *G08G 1/0125* (2013.01); *G01S 19/14* (2013.01); *G06Q 2240/00* (2013.01)

(58) Field of Classification Search
None
See application file for complete search history.

(56) References Cited

U.S. PATENT DOCUMENTS

| | | | |
|---|---|---|---|
| 7,102,496 B1 | 9/2006 | Ernst, Jr. | |
| 7,124,027 B1 | 10/2006 | Ernst, Jr. | |
| 2004/0246147 A1* | 12/2004 | von Grabe | G01C 21/3492 340/995.13 |
| 2012/0173530 A1* | 7/2012 | Kurciska | G06F 17/30241 707/738 |
| 2013/0282264 A1* | 10/2013 | Bastiaensen | G01C 21/3492 701/119 |
| 2014/0278052 A1* | 9/2014 | Slavin | G01C 21/3492 701/400 |
| 2015/0194055 A1* | 7/2015 | Maass | B60W 50/14 340/905 |
| 2016/0035223 A1* | 2/2016 | Gutmann | B60W 30/09 340/907 |
| 2017/0101097 A1* | 4/2017 | Buchner | B60W 30/12 |
| 2017/0123421 A1* | 5/2017 | Kentley | G01C 21/26 |
| 2017/0287331 A1* | 10/2017 | Laur | G08G 1/096725 |
| 2018/0089518 A1* | 3/2018 | Yamashita | G06K 9/00805 |
| 2018/0342156 A1* | 11/2018 | Martin | G01H 9/004 |
| 2018/0345963 A1* | 12/2018 | Maura | G06K 9/00798 |
| 2020/0073388 A1* | 3/2020 | Shashua | G05D 1/0287 |

* cited by examiner

*Primary Examiner* — Rami Khatib
(74) *Attorney, Agent, or Firm* — Mahamedi IP Law LLP (57) ABSTRACT

A transport system can receive vehicle data from each self-driving vehicle (SDV) in a fleet of SDVs operating throughout a given region. The transport system may further detect, in the vehicle data, a set of properties of one or more other vehicles external to the SDV. Based on the set of properties of the one or more vehicles, the transport system can construct traffic model(s) for the given region. Utilizing the traffic model(s), the transport system can provide estimated time of arrival (ETA) data, corresponding to SDVs in the fleet, to users of a transportation arrangement service in the given region.

17 Claims, 7 Drawing Sheets

TRAVEL TIME ESTIMATION

CROSS REFERENCE TO RELATED APPLICATION

This application claims the benefit of priority to U.S. Provisional Application No. 62/345,289, entitled "IMPROVING TRAVEL TIME ESTIMATION," and filed on Jun. 3, 2016; which is hereby incorporated by reference in its entirety.

BACKGROUND

Traffic and mapping resources typically utilize global positioning system (GPS) data from mobile devices of drivers and passengers of vehicles traveling throughout a given region. The accuracy of GPS data may provide general information corresponding to traffic and estimated time of arrival (ETA) data when, for example, a driver has inputted a destination on a mapping resource of a mobile computing device. However, the accuracy of ETA information can be diminished due to dynamic changes in road and traffic conditions occurring in real-time, and may be significantly different from actual arrival times.

Self-driving vehicle (SDV) technology can require continuous sensor data processing of a physical surrounding environment in order to enable the SDV to autonomously operate on public roads in typical traffic conditions. Certain SDVs utilize camera sensors (e.g., single cameras or stereoscopic cameras) that implement image processing and/or active ranging systems (e.g., radar and/or LIDAR systems) in order to continuously survey the surrounding environment of the SDV to detect and avoid any potential hazards while obeying traffic laws and signals.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

A transport system is disclosed herein that can leverage vehicle data from a fleet of SDVs traveling throughout a given region in order to construct dynamical traffic models that can provide lane-specific traffic information for the given region. Utilizing the dynamically constructed traffic models, the transport system can provide improved travel time estimations or estimated time of arrival (ETA) data, corresponding to one or more of the fleet of SDVs, to a number of users in the given region. According to some aspects, the vehicle data comprises lane specific data indicating a current lane of a road on which the respective SDV travels. Furthermore, in certain aspects, the vehicle data can further include dynamic speed data for the respective SDV. Accordingly, in one example, the transport system can dynamically construct the traffic model for the given region in real time based on changes in the dynamic speed data for the fleet of SDVs.

Additionally, the transport system can dynamically construct the traffic model by incorporating the lane specific data to indicate traffic flows for individual lanes of multi-lane intersections throughout the given region. Further still, the transport system can dynamically construct the traffic model by calculating timing data for individual traffic signals throughout the given region based on the traffic flows for the individual lanes. Accordingly, the calculated timing data can correspond to variable traffic signals in the given region, enabling the transport system to precisely determine, in real time, timing information for the signal states (e.g., red, yellow, green) for each lane in each direction of the intersection corresponding to the traffic signal.

According to one or more examples, the vehicle data receive from the fleet of SDVs can include location data that indicates a current location of each respective SDV in the fleet. Furthermore, in some aspects, the transport system can provide the ETA data on an interactive map for the given region via an executing rider application on mobile computing devices of the users. The interactive map can enable users to input a pick-up location on the interactive map and view ETA data for one or more proximate SDVs in the fleet in relation to the inputted pick-up location. Furthermore, the interactive map can indicate the dynamic locations of the proximate SDVs, and the ETA data for the SDV(s) (e.g., a most proximate SDV) can be based on the dynamically constructed traffic models.

In certain implementations, the transport system can receive a pick-up request from a requesting user based on an inputted location on the interactive map, and select an SDV, from one or more proximate SDVs in relation to the inputted pick-up location, to service the pick-up request. The transport system can then transmit confirmation information to a mobile computing device of the requesting user, where the confirmation information can identify the selected SDV and ETA information for the selected SDV to arrive at the pick-up location. According to examples described herein, the ETA information provided on the requesting user's mobile computing device can be based on the dynamically constructed traffic model.

Additionally or alternatively, the transport system can transmit lane specific route information to a selected SDV to cause the selected SDV to autonomously drive to the pick-up location and a destination corresponding to the pick-up request. In certain implementations, the lane specific route information can indicate a most optimal path through traffic based on the dynamically constructed traffic model. Furthermore, in one aspect, the transport system can dynamically determine the lane specific route information as the SDV travels to the pick-up location and the destination. Thus, the transport system can also manage a transportation arrangement service utilizing the fleet of SDVs to service pick-up requests submitted by any of the users in the given region. As described herein, the fleet of SDVs can comprise on the order of hundreds, thousands, tens of thousands, or even hundreds of thousands operating throughout the given region.

According to examples described herein, based on the pick-up location, the transport system can identify a pool of available and unavailable SDVs that are proximate to the pick-up location. As used herein, an "available SDV" is an SDV that is in a standby mode, or otherwise not currently transporting a user. An "unavailable SDV" is an SDV that is currently transporting a user to a drop-off destination, upon which the unavailable SDV becomes available. The transport system can utilize the dynamically constructed traffic model to select, from the proximate available and unavailable SDVs, an optimal SDV to service the pick-up request for the requesting user. In one example, the transport system can select the optimal SDV by executing an optimization operation using the dynamically constructed traffic model to determine that the optimal SDV has a lowest ETA to the pick-up location. Thus, the optimization operation can account for drop-off time deltas for the unavailable SDVs as well as projected, lane specific route optimizations to the pick-up locations for each of the SDVs in the pool.

Still further, examples herein recognize that dynamically constructed traffic models may include inaccurate or stale data in certain areas of the region when SDVs are not traveling through such areas. In one example, the transport system can identify such stale vehicle data in the dynamically constructed traffic models. For example, the stale data can indicate that no SDVs in the fleet have traveled along a particular road for a predetermined period of time (e.g., ten minutes). In response to identifying the stale vehicle data, the transport system can transmit a transport directive to at least one of the fleet of SDVs, instructing the SDV(s) to drive through the particular area to provide refreshed vehicle data in order to update the dynamically constructed traffic model for the particular area.

Among other benefits, the examples described herein achieve a technical effect of improving ETA information for SDVs as well as optimizing SDV selection for servicing pick-up requests and optimizing route data for a fleet of SDVs. In generating a dynamic traffic model utilizing lane-specific surface data from the fleet of SDVs, the transport system can not only bolster accuracy and efficiency with respect to ETA information and SDV selection, but can also improve overall traffic in the given region by making route information more granular (e.g., lane-specific).

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

System Description

Figure 1:
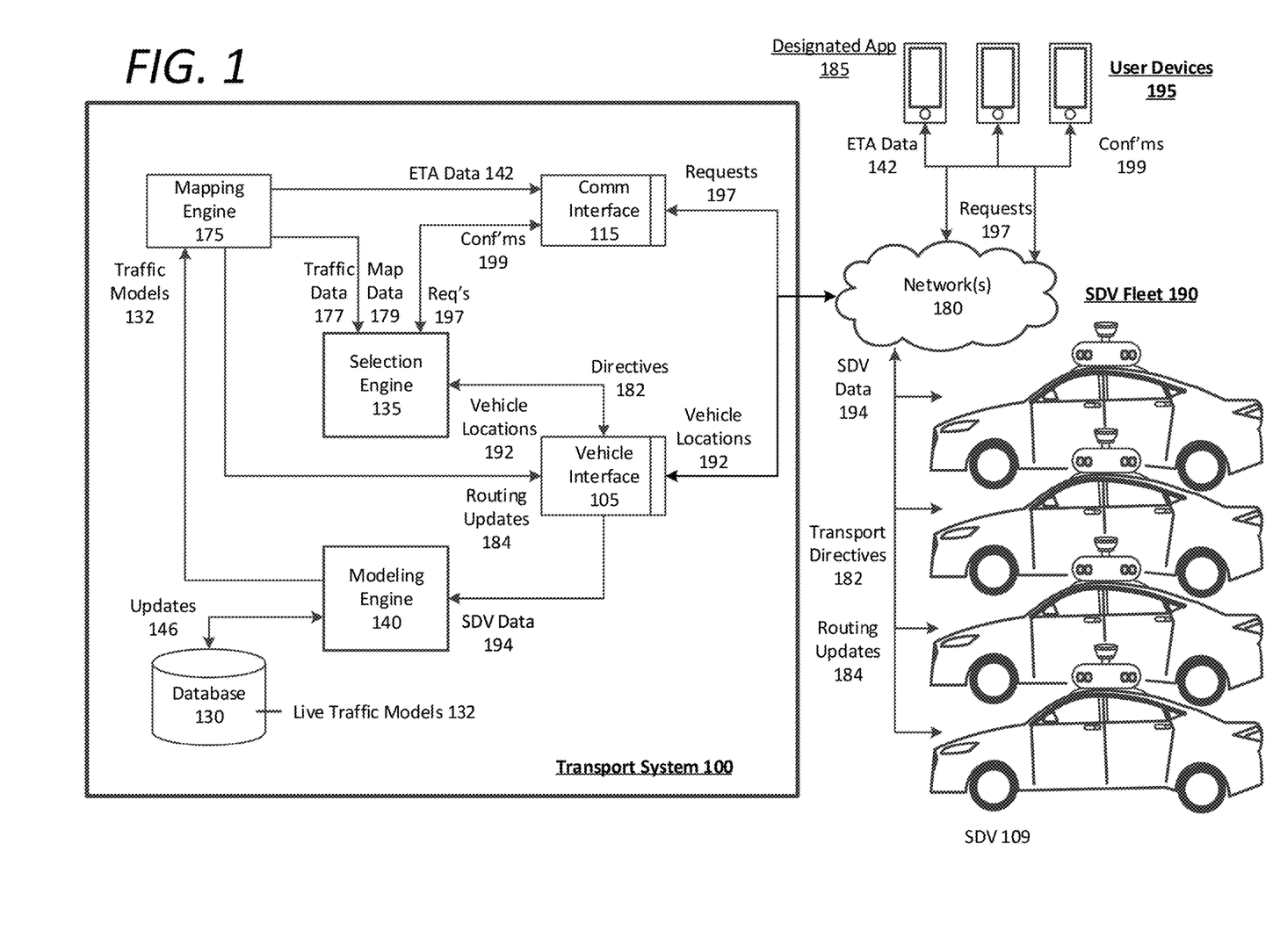
FIG. 1 is a block diagram illustrating an example transport system in communication with user devices and a fleet of transport vehicles, as described herein.

FIG. 1 is a block diagram illustrating an example transport system in communication with user devices and a fleet of transport vehicles, as described herein. The transport system 100 can include a communications interface 115 to communicate with the user devices 195 and the fleet of self-driving vehicles (SDVs) 190 over a number of networks 180. In addition or in variations, the transport system 100 can communicate with human drivers operating transport vehicles, via the drivers' mobile devices or on-board computer systems, to facilitate transportation in accordance with a transportation arrangement service managed by the transport system 100. In many examples, the transport system 100 can provide the transportation arrangement service to link requesting users with transport vehicles and/or AVs or SDVs in the fleet 190 managed by the transport system 100. Such vehicles in the fleet 190 may be managed directly by the transport system 100, or vehicles owned by third-party entities that are available to service pick-up requests 197. A designated application 185 corresponding to the transportation arrangement service can be executed on the user devices 195. A requesting user can provide an input on a user device 195 to transmit a pick-up request 197 to the transport system 100. The pick-up request 197 can be received by the communications interface 115 and sent to a selection engine 135, which can match the requesting user with a proximate transport vehicle, in relation to a pick-up location, from the fleet of available vehicles 190.

In one or more examples, the pick-up request 197 can include a pick-up location where a selected SDV 109 can rendezvous with the requesting user. The fleet of SDVs 190 can be dispersed throughout a given region (e.g., a city or metropolitan area) and transmit vehicle location data 192 to a vehicle interface 105 of the transport system 100. The vehicle interface 105 can transmit the vehicle locations 192 to the selection engine 135 in order to enable the selection engine 135 to determine candidate vehicles that can readily service the pick-up request 197.

According to examples described herein, the transport system 100 can include a modeling engine 140 that processes SDV data 194 from the SDV fleet 190 to construct live traffic models 132. In one aspect, the live traffic models 132 can be continuously constructed and stored in a database 130 of the transport system 100. As SDV data 194 is received, the modeling engine 140 can generate updates for the live traffic models 132 in order to maintain accuracy. In order to resolve the deficiencies in current mapping systems or application, the SDV data 194 can comprise real-time surface data from the sensor systems (e.g., LIDAR and/or camera systems) that can provide the modeling engine 140 with a real-time sensor view of the traffic and road conditions throughout the given area. Additionally, the SDV data 194 can include real-time speed data from the SDVs in the fleet 190 (e.g., from the vehicles' odometer) as well as the location data 192 from, for example, on-board GPS resources of the SDVs 190. Additionally or alternatively, the SDV data 194 can comprise fine granular localization and pose information of the SDVs in the fleet.

As provided herein, each SDV 109 in the fleet 190 can perform localization and pose operations in order to determine a precise position and orientation with respect to the SDV's surrounding environment (e.g., on the order of centimeters). Such positioning determinations can be greater than an order of magnitude more accurate than GPS-based systems. In performing localization, each SDV 109 can utilize previously recorded surface maps—or sub-maps—of the given region to dynamically compare with sensor data (e.g., LIDAR and/or stereoscopic camera data) from the SDV 109. Such sub-maps can be recorded by certain SDVs 109 in the fleet 190, and can be processed by the transport system 100 for use in all of the SDVs in the fleet 190. Thus, utilizing the sub-maps the SDVs 109 can each continuously perform precise positioning and determine its orientation with respect to the sub-maps (i.e., localization and pose). This allows the SDVs 109 to operate within the lanes of public roads, stop on the correct markers at intersections, and/or correlate position with a mapping or routing resource to autonomously drive to respective destinations.

The received SDV data 194 can include such precise positioning information from the SDVs 109, and the modeling engine 140 can utilize such information to construct the lane-specific traffic models 132 in real time. Accordingly, not only do the traffic models 132 include general directional traffic and ETA information—such as in current mapping systems—the traffic models 132 further include more granular traffic flows for each lane of multi-lane roads. Furthermore, due to the precise nature of the traffic models 132 the modeling engine 140 can further determine real-time traffic signal states (e.g., red versus green) for intersections throughout the given region based on the lane flows. Thus, the modeling engine 140 can further include current timing information for both standard and variably timed traffic signals in the traffic models 132 in order to further bolster the accuracy.

In further implementations, the SDV data 194 can include data indicating other vehicles external to the SDV. For example, the SDV data 194 can comprise image data from one or more cameras of the SDV, and/or LIDAR data from a LIDAR system of the SDV. In various examples, the modeling engine 140 can determine a set of properties of the other vehicles external to the SDV, such as a relative velocity, lane-specific traffic density, whether the vehicles are accelerating, braking, or turning, any vehicle incidents (e.g., a traffic accident), and the like. As described herein, the modeling engine 140 further construct the traffic models 132 based on the set of properties of the other vehicles identified in the SDV data 194.

The modeling engine 140 can continuously receive the SDV data 194 from the fleet of SDVs 190 as they operate throughout the given region. Thus, the modeling engine 140 can further provide continuous or near-continuous updates 146 to the traffic models 132 in order to maintain accuracy. According to some examples, the transport system 100 can include mapping engine 175. In certain implementations, the mapping engine 175 can provide the selection engine 135 with map data 179 and/or traffic data 177, which the selection engine 135 can utilize to make vehicle selections. For example, the selection engine 135 can identify a pick-up location in a pick-up request 197, receive SDV locations 192 of SDVs in the fleet 190 that are proximate to the pick-up location, and utilize the map data 179 and traffic data 177 to select an optimal SDV 109 to service the pick-up request 197.

According to examples herein, the mapping engine 175 can bolster accuracy in the traffic data 177 by utilizing the dynamically constructed traffic models 132 in the database 130. Thus, the traffic data 177 can be based on the live traffic models 132 constructed by the modeling engine 132. The selection engine 135 can utilize the traffic data 177 to accurately estimate arrival times for each proximate SDV in relation to the pick-up location. The selection engine 135 may then rely on these estimated arrival times to make a selection (e.g., select an SDV 109 having the shortest estimated arrival time to the pick-up location). Accordingly, the selection of an SDV 109 to service a pick-up request may also be based on the dynamically constructed traffic models 132.

Furthermore, utilizing the live traffic models 132 the mapping engine 175 can provide improved ETA data 142 for user devices 195, so that requesting users can readily identify, with increased precision, improved ETAs for one or more proximate SDVs in the fleet 190. The ETA data 142 can be provided via a mapping feature through the designated application 185 on the user devices 195, and can also include virtual representations of the proximate vehicles.

For example, a user can input a location (e.g., a current location or pick-up location) on the mapping feature, and the designated application 185 can show live representations of proximate SDVs 109 traveling on the map, with ETA data 142 for one or more of the SDVs 109 (e.g., a physically or temporally nearest SDV). Still further, in many implementations, when a SDV 109 is selected to service a particular pick-up request 197, the mapping engine 175 can provide the user device 195 corresponding to the pick-up request with the ETA data 142 of the selected SDV 109—where the ETA data 142 is based on the live traffic models 132 constructed by the modeling engine 140.

Additionally, as the selected SDV 109 operates throughout the given region, the SDV 109 can follow a route generated either locally on a mapping resource of the SDV 109, or by way of the mapping engine 175 of the transport system 100. This high level route can comprise an optimal surface street route to a destination based on current traffic conditions at the time of determination (e.g., when the SDV 109 picks up the user for transport to a destination, or when the SDV 109 receives a transport directive 182 to head to a pick-up location). According to some examples, the mapping engine 175 of the transport system 100 can provide the SDV 109 with mid-level routing updates 184 that enable the SDV 109 to perform mid-level tasks such as changing lanes or temporarily diverging from the current route in order to condense travel time. For example, the mapping engine 175 can identify upcoming, lane-specific traffic for the SDV 109. The traffic information can indicate that a particular lane is moving faster or more optimally than the other lanes. As such, the mapping engine 175 can provide a routing update 184 to the SDV 109 to make one or more lane changes or to make a quick detour to most efficiently get through or avoid a particular pocket of traffic (e.g., at a crowded intersection).

On a broader scale, the transport system 100 can provide such mid-level routing updates 184 to each of the fleet of SDVs 190 as they travel throughout the given region. The collective effect of such mid-level routing updates 184 can be to homogenize traffic flows through traffic pockets in the given region. Furthermore, because the modeling engine 140 can utilize highly accurate, real time data from the SDVs themselves, the time between a user's submission of a pick-up request 197 and being picked up by an optimal SDV 109 can be minimized. Still further, because the mapping engine 175 can utilize the live traffic models 132 to provide mid-level routing updates 184, the travel time between the pick-up location and the destination can also be minimized. On a large scale (e.g., a citywide scale), the collective time saved for users of the transportation service can be quite significant. Also, due to the accuracy of the traffic models 132, a user can be provided with ETA data 142 indicating an improved estimated time of arrival for a selected SDV 109 to rendezvous with the user and an improved estimated travel time to the destination. Thus, not only are waiting time and travel time minimized, but also the error in the time estimations provided to the user. Furthermore, because the traffic models 132 may be a significant improvement one current ETA, routing, and mapping technology, the transport system 100 can provide such traffic models 132 to third-parties, such as mapping and routing resources for human-driven vehicles. Alternatively, the transport system 100 can provide such mapping and routing resources—utilizing the dynamically constructed traffic models—directly to user devices 195 via the designated application 185 or via an alternate mapping application for use by the users when they drive throughout the given region.

Figure 2:
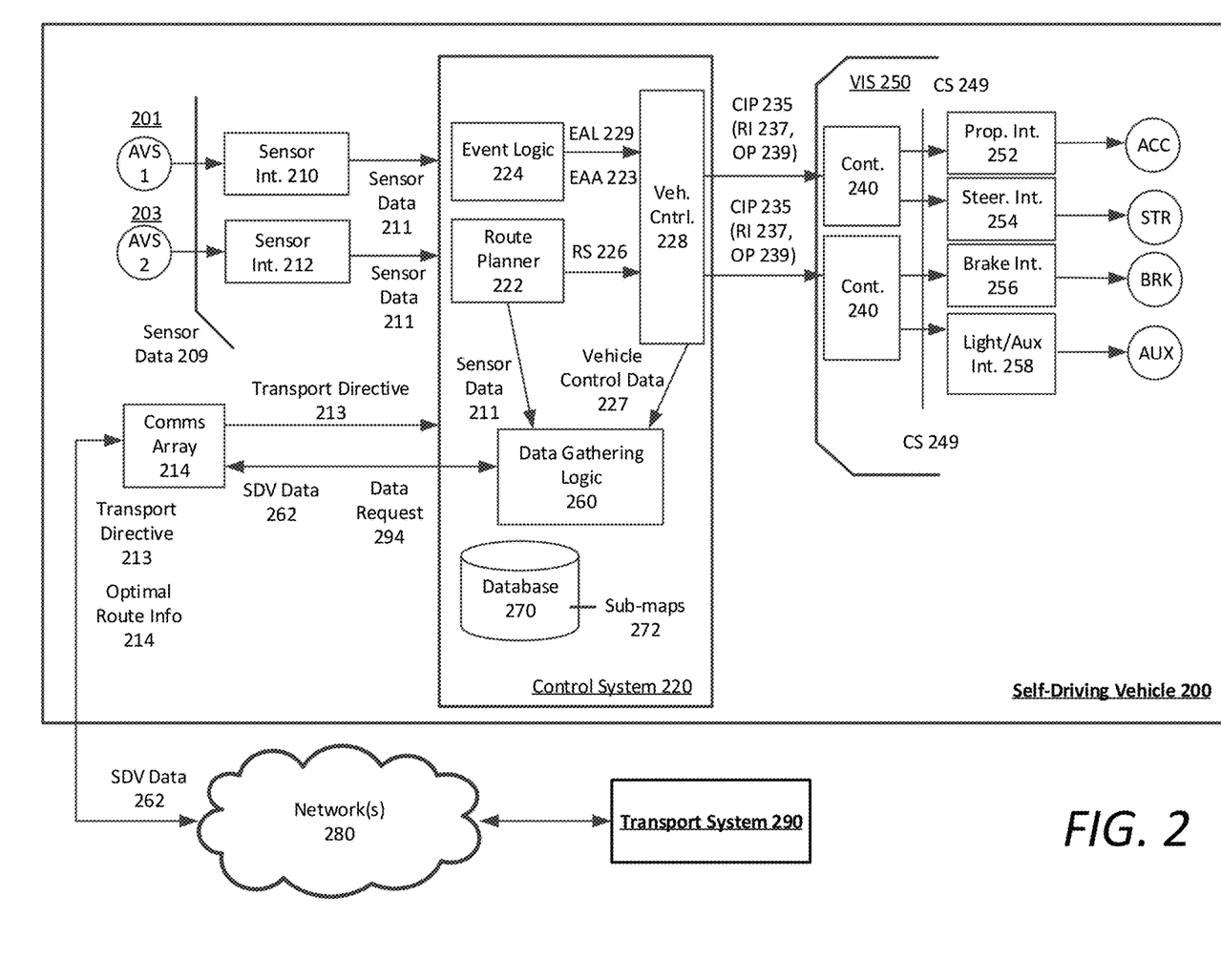
FIG. 2 is a block diagram illustrating an example AV or SDV implementing a control system, as described herein.

FIG. 2 is a block diagram illustrating an example AV or SDV implementing a control system, as described herein. In an example of FIG. 2, a control system 220 can autonomously operate the SDV 200 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously or manually.

According to some examples, the control system 220 can utilize specific sensor resources in order to intelligently operate the vehicle 200 in most common driving situations. For example, the control system 220 can operate the vehicle 200 by autonomously operating the steering, accelerating, and braking systems of the vehicle 200 as the vehicle progresses to a destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes a computer or processing system which operates to process sensor data that is obtained on the vehicle 200 with respect to a road segment upon which the vehicle 200 operates. The sensor data can be used to determine actions which are to be performed by the vehicle 200 in order for the vehicle 200 to continue on a route to a destination. In some variations, the control system 220 can include other functionality, such as wireless communication capabilities, to send and/or receive wireless communications with one or more remote sources. In controlling the vehicle 200, the control system 220 can issue instructions and data, shown as commands 235, which programmatically control various electromechanical interfaces of the vehicle 200. The commands 235 can serve to control operational aspects of the vehicle 200, including propulsion, braking, steering, and auxiliary behavior (e.g., turning lights on).

The SDV 200 can be equipped with multiple types of sensors 201, 203 which can combine to provide a computerized perception of the space and the physical environment surrounding the vehicle 200. Likewise, the control system 220 can operate within the SDV 200 to receive sensor data 211 from the collection of sensors 201, 203, and to control various electromechanical interfaces for operating the vehicle 200 on roadways.

In more detail, the sensors 201, 203 operate to collectively obtain a complete sensor view of the vehicle 200, and further to obtain situational information proximate to the vehicle 200, including any potential hazards proximate to the vehicle 200. By way of example, the sensors 201, 203 can include multiple sets of cameras sensors 201 (video cameras, stereoscopic pairs of cameras or depth perception cameras, long range cameras), remote detection sensors 203 such as provided by radar or LIDAR, proximity or touch sensors, and/or sonar sensors (not shown).

Each of the sensors 201, 203 can communicate with the control system 220 utilizing a corresponding sensor interface 210, 212. Each of the sensor interfaces 210, 212 can include, for example, hardware and/or other logical components which are coupled or otherwise provided with the respective sensor. For example, the sensors 201, 203 can include a video camera and/or stereoscopic camera set which continually generates image data of the physical environment of the vehicle 200. As an addition or alternative, the sensor interfaces 210, 212 can include a dedicated processing resource, such as provided with a field programmable gate array ("FPGA") which can, for example, receive and/or process raw image data from the camera sensor.

In some examples, the sensor interfaces 210, 212 can include logic, such as provided with hardware and/or programming, to process sensor data 209 from a respective sensor 201, 203. The processed sensor data 209 can be outputted as sensor data 211. As an addition or variation, the control system 220 can also include logic for processing raw or pre-processed sensor data 209.

According to one implementation, the vehicle interface subsystem 250 can include or control multiple interfaces to control mechanisms of the vehicle 200. The vehicle interface subsystem 250 can include a propulsion interface 252 to electrically (or through programming) control a propulsion component (e.g., an accelerator actuator), a steering interface 254 for a steering mechanism, a braking interface 256 for a braking component, and a lighting/auxiliary interface 258 for exterior lights of the vehicle 200. According to implementations described herein, control signals 249 can further be transmitted to a component interface 255 of the vehicle interface subsystem 250 to control various components and/or accommodation features 266 of the SDV 200 based on, for example, a physical impairment of the user. The vehicle interface subsystem 250 and/or the control system 220 can further include one or more controllers 240 which can receive commands 233, 235 from the control system 220. The commands 235 can include route information 237 and operational parameters 239—which specify an operational state of the vehicle 200 (e.g., desired speed and pose, acceleration, etc.). The commands can further include accommodation commands 233 to cause the controller 240 to configure a number of adjustable components of the SDV 200 via the component interface 255.

The controller(s) 240 can generate control signals 249 in response to receiving the commands 233, 235 for one or more of the vehicle interfaces 252, 254, 255, 256, 258. The controllers 240 can use the commands 235 as input to control propulsion, steering, braking, and/or other vehicle behavior while the SDV 200 follows a current route. Thus, while the vehicle 200 actively drives along the current route, the controller(s) 240 can continuously adjust and alter the movement of the vehicle 200 in response to receiving a corresponding set of commands 235 from the control system 220. Absent events or conditions which affect the confidence of the vehicle 220 in safely progressing along the route, the control system 220 can generate additional commands 235 from which the controller(s) 240 can generate various vehicle control signals 249 for the different interfaces of the vehicle interface subsystem 250.

According to examples, the commands 235 can specify actions to be performed by the vehicle 200. The actions can correlate to one or multiple vehicle control mechanisms (e.g., steering mechanism, brakes, etc.). The commands 235 can specify the actions, along with attributes such as magnitude, duration, directionality, or other operational characteristics of the vehicle 200. By way of example, the commands 235 generated from the control system 220 can specify a relative location of a road segment which the SDV 200 is to occupy while in motion (e.g., changing lanes, moving into a center divider or towards shoulder, turning the vehicle, etc.). As other examples, the commands 235 can specify a speed, a change in acceleration (or deceleration) from braking or accelerating, a turning action, or a state change of exterior lighting or other components. The controllers 240 can translate the commands 235 into control signals 249 for a corresponding interface of the vehicle interface subsystem 250. The control signals 249 can take the form of electrical signals which correlate to the specified vehicle action by virtue of electrical characteristics that have attributes for magnitude, duration, frequency or pulse, or other electrical characteristics.

In an example of FIG. 2, the control system 220 can include a route planner 222, event logic 224, and vehicle control logic 228. The vehicle control logic 228 can convert alerts of event logic 224 ("event alert 229") into commands 235 that specify a set of vehicle actions. Furthermore, in operating the acceleration, braking, and steering systems of the SDV 200, the control system 220 can include a database 270 that stores previously recorded and processed sub-maps 272 of the given. As described herein, the sub-maps 272 can comprise processed or normalized surface data that enables the control system 220 to compare with the sensor data 211 in order to identify any potential hazards.

Additionally, the route planner 222 can select one or more route segments 226 that collectively form a path of travel for the SDV 200 when the vehicle 200 is on a current trip (e.g., servicing a pick-up request). In one implementation, the route planner 222 can specify route segments 226 of a planned vehicle path which defines turn by turn directions for the vehicle 200 at any given time during the trip. The route planner 222 may utilize the sensor interface 212 to receive GPS information as sensor data 211. The vehicle control 228 can process route updates from the route planner 222 as commands 235 to progress along a path or route using default driving rules and actions (e.g., moderate steering and speed).

In examples described herein, the route planner 22 can receive optimal route information 214 over the network 280 from the transport system 290 based on constructed traffic models described herein. According to such examples, the optimal route information 214 can include real-time granular information regarding not only a high level route to take, but which lane the SDV 200 should presently select, whether the SDV 200 should take a detour or alternative path (e.g., to avoid a crowded intersection), and other immediate or upcoming actions that can optimize arrival times. Accordingly, in addition to generating a high level route from a current location to a destination, the route planner 222 can utilize the optimal route information 214 from the transport system 290 to mid-level route decisions.

As an example, the control system 220 can receive a transport directive 213 indicating a pick-up location to rendezvous with a requesting user. The control system 220 can accept the directive 213 and utilize the route planner 222 autonomously drive to the pick-up location along a high level route decided by the route planner 222. After rendezvousing with the requesting user, the control system 220 can autonomously operate the acceleration, braking, and steering systems 252, 254, 256 to transport the requesting user to a selected destination along a high level route selected by the route planner 222. On a more granular level, or a mid-level, as the control system 220 drives the SDV 200, the control system can receive optimal route information 214 from the transport system 290 indicating road details to further optimize the trip. For example, the optimal route information 214 can indicate an upcoming back-up in traffic, and can further indicate that the right lane is currently moving faster than the left lane.

The control system 220 can utilize the optima route information 214 from the transport system 290 to perform mid-level actions, such as selecting a faster traffic lane on a freeway, or a more optimal lane to get through an intersection. The control system's 220 responses to the optimal route information 214 may not affect the high level route selected by the route planner 222, but can rather enable the control system 220 to arrive at a particular destination as quickly as possible given the traffic conditions experienced along the way. In certain variations, the optimal route information 214 can cause the route planner 222 to identify an alternate path within the overall route (e.g., taking a side street or making a turn one intersection prior to that indicated by the high level route). Thus, by utilizing the dynamically constructed traffic models, the transport system 290 can further aid the SDV 200 in optimizing travel times to pick-up locations and destinations. Furthermore, at the same time, the SDV 200 can provide the transport system 290 with SDV data 262 as feedback for constructing the traffic models, as described below.

In certain implementations, the event logic 224 can trigger low level responses to detected events. A detected event can correspond to a roadway condition or obstacle which, when detected, poses a potential hazard or threat of collision to the vehicle 200. By way of example, a detected event can include an object in the road segment, heavy traffic ahead, and/or wetness or other environmental conditions on the road segment. The event logic 224 can use sensor data 211 from cameras, LIDAR, radar, sonar, or various other image or sensor component sets in order to detect the presence of such events as described. For example, the event logic 224 can detect potholes, debris, objects projected to be on a collision trajectory, and the like. Thus, the event logic 224 can detect events which enable the control system 220 to make evasive actions or plan for any potential hazards.

When events are detected, the event logic 224 can signal an event alert 229 that can classify the event and indicates the type of avoidance action to be performed. Additionally, the control system 220 can determine whether an event corresponds to a potential incident with a human driven vehicle, a pedestrian, or other human entity external to the SDV 200. In turn, the vehicle control 228 can determine a low level response based on a score or classification of the event. Such response can correspond to an event avoidance action 223, or an action that the vehicle 200 can perform to maneuver the vehicle 200 based on the detected event and its score or classification. By way of example, the vehicle response can include a slight or sharp vehicle maneuver for avoidance using a steering control mechanism and/or braking component. The event avoidance action 223 can be signaled through the commands 235 for controllers 240 of the vehicle interface subsystem 250.

When an anticipated dynamic object of a particular class does in fact move into position of likely collision or interference, some examples provide that event logic 224 can signal the event alert 229 to cause the vehicle control 228 to generate commands 235 that correspond to an event avoidance action 223. For example, in the event of an incident in the path of the vehicle 200, the event logic 224 can signal the event alert 229 to avoid a collision. The event alert 229 can indicate (i) a classification of the event (e.g., "serious" and/or "immediate"), (ii) information about the event, such as the type of object that generated the event alert 229, and/or information indicating a type of action the vehicle 200 should take (e.g., location of object relative to path of vehicle, size or type of object, etc.).

According to examples described herein, SDV 200 can include a communications array 214 to communicate over one or more networks 280 with a backend, transport system 290, such as the transport system 100 described with respect to FIG. 1. In some aspects, when the SDV 200 is selected to service a pick-up request, the communications array 214 can receive a transport directive 213 from the transport system 290 to service the pick-up request and drive to a pick-up location to rendezvous with the requesting user. In such aspects, the transport directive 213 can be transmitted to the control system 220 in order to autonomously drive the SDV 200 to the pick-up location.

According to examples described herein, the SDV 200 can further include data gathering logic 260 that can facilitate the transport system 290 in generating the dynamic traffic models. In one example, the transport system 290 can transmit a data request 294 to the SDV 200, which can be processed by the data gathering logic 260 in order to generate SDV data 262 to be transmitted back to the transport system 290 in response. In variations, the control system 220 can periodically or continuously transmit the SDV data 262 to the transport system 290 automatically or based on a predetermined protocol.

The SDV data 262 can comprise raw or processed sensor data 211 from the SDV's sensors 201, 203, and/or vehicle control data 227, which can indicate the SDV's speed, orientation, location. Thus, the SDV data 262 can include vehicle specific data that includes information directly concerning the SDV 200, and can further include sensor view data from the SDV's 200 sensors (e.g., LiDAR or stereo-camera sensor systems) that can indicate road and traffic conditions in lanes proximate to the SDV 200. In some examples, the SDV data 262 can provide the transport system 290 with information indicating traffic flow in an opposite direct to the SDV's 200. Thus, the collective SDV data submitted to the transport system 290 from SDVs operating throughout the given region can enable the transport system 290 to construct highly accurate, real-time traffic models. In constructing such models, the transport system 290 can manage the mid-level routing for the SDV fleet by providing those SDVs with optimal route information that can collectively homogenize traffic such that ETA information is highly accurate for users of the transport service that are awaiting a ride, or that are en route to a destination in a servicing SDV.

Figure 3:
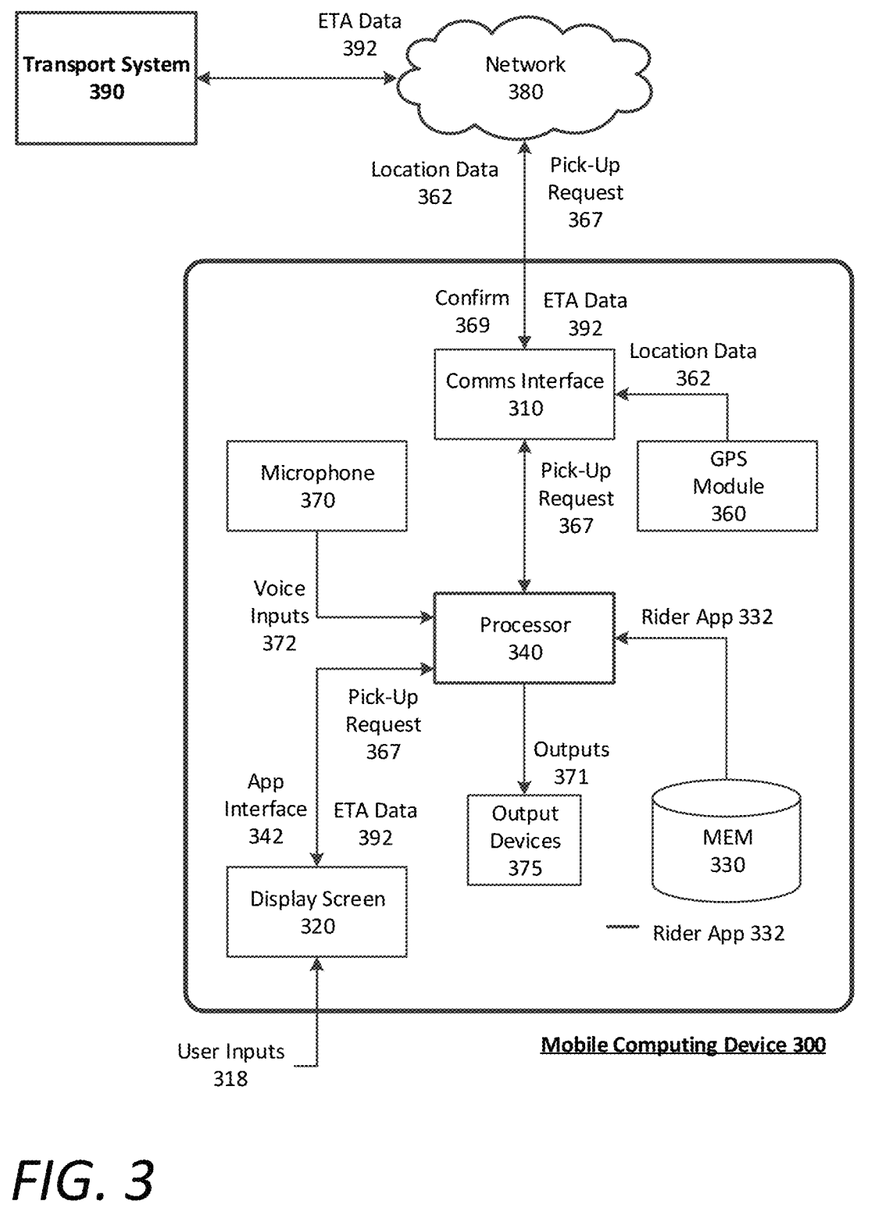
FIG. 3 is a block diagram illustrating an example mobile computing device executing a designated application for a transport arrangement service, as described herein.

FIG. 3 is a block diagram illustrating an example mobile computing device executing a designated application for a transport arrangement service, as described herein. The mobile computing device 300 can store a designated application (e.g., a rider app 332) in a local memory 330. In response to a user input 318, the rider app 332 can be executed by a processor 340, which can cause an app interface 342 to be generated on a display screen 320 of the mobile computing device 330. The app interface 342 can enable the user to, for example, check current price levels and availability for the transportation arrangement service. In various implementations, the app interface 342 can further enable the user to select from multiple ride services, such as a carpooling service, a regular rider service, a professional rider service, a van transport service, a luxurious ride service, and the like. The app interface 342 can further display an interactive map that enables the user to input a pick-up location, view ETA information of nearby available drivers, confirm a pick-up request 367, and the like.

The user can generate a pick-up request 367 via user inputs 318 provided on the app interface 342. For example, the user can select a pick-up location, view the various service types and estimated pricing, and select a particular service for transportation to an inputted destination. In certain implementations, current location data 362 from a GPS module 360 of the mobile computing device 300 can be transmitted to the transport system 390 to set the pick-up location. In many examples, the user can also input the destination prior to pick-up. The processor 340 can transmit the pick-up request 367 via a communications interface 310 to the backend transport system 390 over a network 380. In response, the mobile computing device 300 can receive a confirmation 369 from the transport system 390 indicating the selected SDV that will service the pick-up request 367 and rendezvous with the user at the pick-up location.

In certain implementations, the mobile computing device 300 can further include a microphone 370 to enable the user to provide voice inputs 372 to further interact with the rider application 332. For example, instead of provide user inputs 318 on the display screen 320, certain commands can be provided via voice input 372 (e.g., pick-up requests 367, confirmations, cancelations, postponements, etc.). Additionally, the mobile computing device 300 can include one or more output devices 375 that can provide outputs 371 and/or feedback based on user interactions and responses through the rider application 332. Such outputs 371 can include haptic and/or audio feedback (e.g., voice feedback) generated by the rider application 332, such as ride update information, tonal responses, alerts, and the like.

According to examples, the mobile computing device 300 can receive ETA data 392 from the transport system 390 based on the dynamically constructed traffic models described herein. Current ETA information for mapping, routing, and traffic resources may utilize GPS information (e.g., location data 362 from the GPS resources of users' mobile devices). Examples described herein can significantly improve the ETA data 392 based on the constructed models utilizing real-time, lane-specific SDV data, which can further be utilized by the transport system 390 in mid-level routing of the SDVs, as described herein. This can further bolster ETA predictability and provide users of the service with highly accurate ETA information relating to arrival times for pick-up and overall trip time to a destination.

In one example, the ETA data 392 can include estimated arrival times for a plurality of SDVs that are proximate to the user's current location. For example, the app interface 342 can include a mapping feature with real-time virtual representations of SDVs traveling on the mapping feature. The ETA data 392 can include an estimated arrival time for each of the SDVs on the map (e.g., on a miniature window next to the SDV's displayed virtual representation). Additionally or alternatively, the ETA data 392 can include an estimated arrival time of an SDV selected to service a pick-up request 367 submitted by the user. In further examples, the ETA data 392 can include an estimated arrival time to a destination once the user has been pick-up by the selected SDV.

Methodology

Figure 4A:
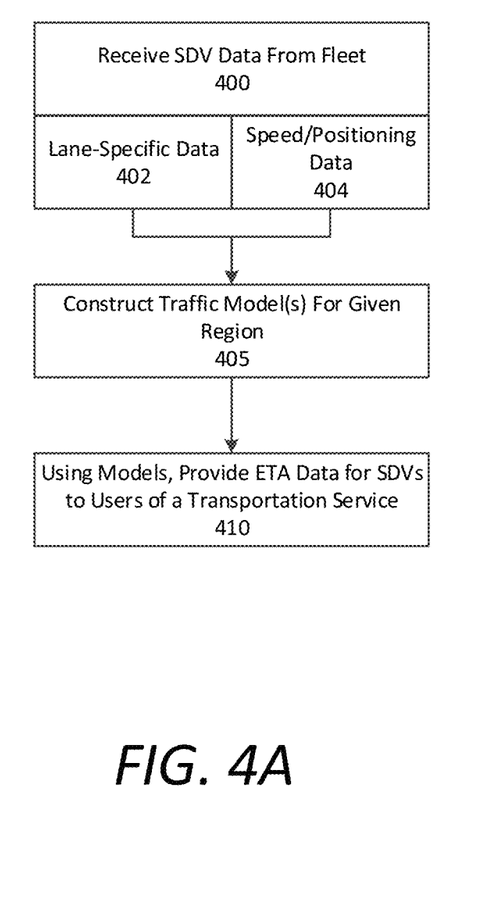
FIGS. 4A and 4B are flow charts describing example methods of traffic modeling and data distribution, according to examples described herein.
Figure 4B:
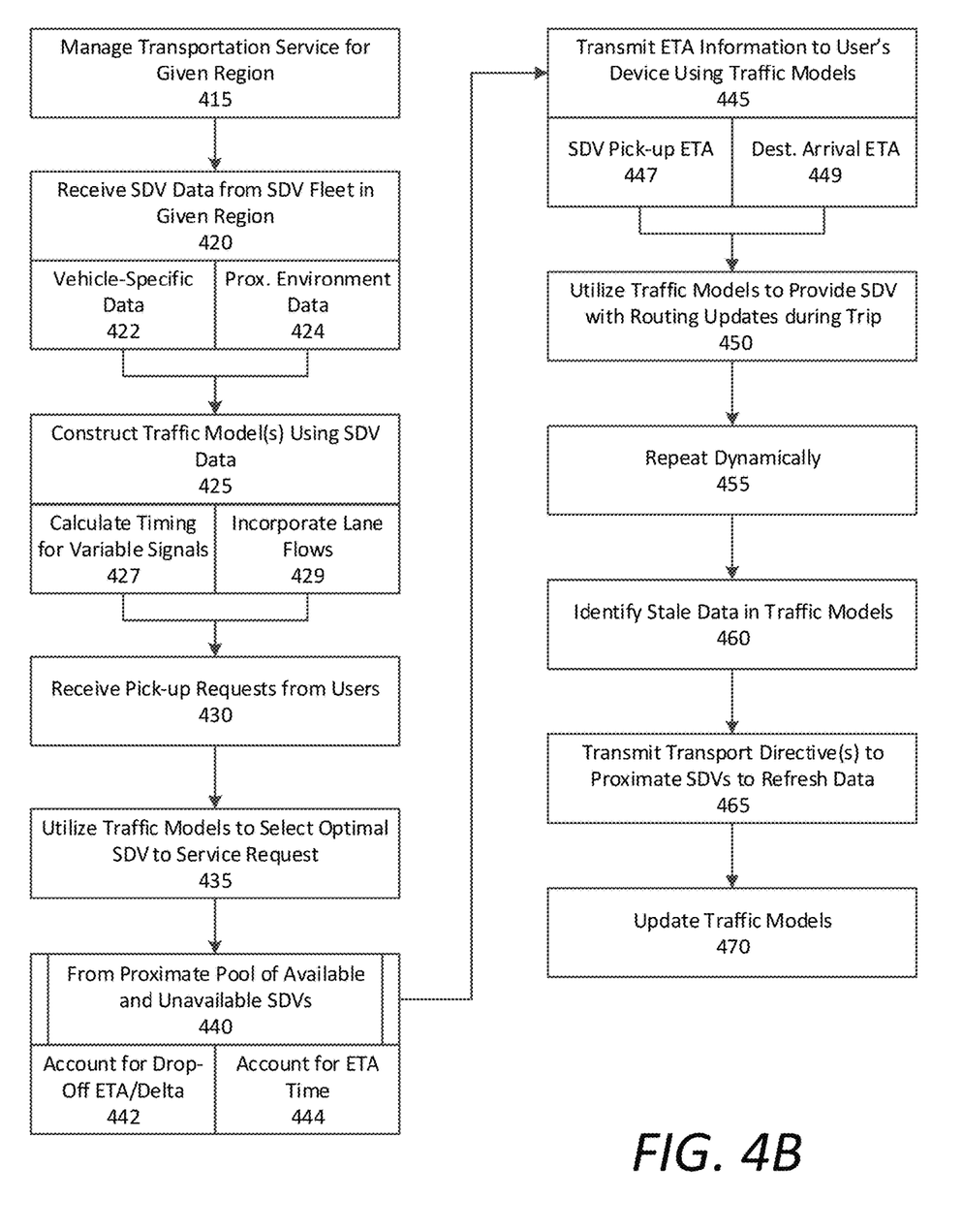

FIGS. 4A and 4B are flow charts describing example methods of traffic modeling and data distribution, according to examples described herein. In the below descriptions of FIGS. 4A and 4B, reference may be made to reference characters representing like features shown and described with respect to FIGS. 1-3. Furthermore, the below methods described with respect to FIGS. 4A and 4B may be performed by an example transport system 100 as described with respect to FIG. 1. Referring to FIG. 4A, the transport system 100 can receive SDV data 194 from a fleet of SDVs 190 traveling throughout a given region (400). In certain implementations described herein, the fleet of SDVs 190 can be managed by the transport system 100 in connection with a transportation arrangement service in which the transport system 100 receives pick-up requests 197 from user devices 195 and selects individual SDVs 109 to service those requests 197 by rendezvousing with the requesting user at a pick-up location and autonomously transporting the user to an inputted destination. In one aspect, the SDV data 194 can include lane-specific data corresponding to the traffic flow of the road lane on which the SDV 109 is currently traveling (402). Additionally, the SDV data 194 can include vehicle specific data, such as speed information, position and/or location of the SDV 109 in the given region, and direction of travel (404). Further still, the SDV data 194 can include sensor view information (e.g., stereo camera data) indicating the surrounding environment of the SDV 109, such as the proximate lanes, opposite traffic, other entities (e.g., other vehicles), and intersection traffic information.

According to some examples, the transport system 100 can construct traffic models 132 for the given region based on the SDV data 194 collectively received from the fleet of SDVs 190 (405). Such traffic models 132 can include data indicating real-time traffic flows for individual lanes throughout the given region. In various examples, the transport system 100 can construct the traffic models 132 in real-time, o periodically (e.g., every few seconds). Furthermore, the traffic models 132 can be local to specific intersections or other traffic hotspots, or can be constructed for an entire region. Using these dynamically or periodically constructed traffic models 132, provide estimated time of arrival (ETA) data 142 for one or more SDVs to users of the transportation arrangement service (410). Such ETA data 142 can indicate an estimated arrival time for a selected SDV 109 to pick-up the user, an estimated arrival time at a destination, and/or a plurality of estimated arrival times for any number of proximate SDVs in relation to the user's current location.

Referring to FIG. 4B, the transport system 100 can, in general, manage a transportation service by receiving pick-up requests 197 from users via a designated application 185 executing on the user's mobile devices 195 and selecting optimal SDVs 109 in a fleet 190 to service those pick-up requests 197 (415). In order to make routing through traffic more efficient and optimize timing for users, the transport system 100 can receive SDV data 194 from the SDV fleet 190 as each SDV 109 operates throughout the given region (420). In many examples, the SDV data 194 can include vehicle-specific data, such as the vehicle's location in the given region, its orientation, speed, a current lane on which the vehicle travels, and the like. Additionally, the SDV data 194 can include data indicating the proximate environment of the vehicle (e.g., raw or processed sensor view data 111), such as the traffic conditions in the lane(s) adjacent to the vehicle or on an opposite side of the road (424). For example, the proximate environment of the SDV 109 can indicate a number of other vehicles external to the SDV 109. The transport system 100 can determine a set of properties of the other vehicles (e.g., speed, brake lights, relative velocity to the SDV 109, traffic density, etc.) and utilize this et of properties to construct the traffic models 132. In one example, the transport system 100 can extrapolate lane-specific traffic conditions on lanes external to the vehicle's travel lane, including opposing traffic, by factoring the vehicle's speed versus sensor view data 111 from the vehicle that indicates the other vehicles' speeds.

According to examples described herein, the transport system 100 may then construct one or more traffic model(s) 132 for the given region using the SDV data 194 from the fleet (425). In constructing the traffic model(s) 132, the transport system 100 can calculate timing for traffic signals, such as fixed or variably timed traffic signals (427), and incorporate individual lane flows in the traffic model(s) (429). In one example, the transport system 100 can construct smaller scale individual traffic models 132 that cover a particular traffic pocket, such as an area surrounding an intersection with heavy traffic, or bottlenecks on freeways. Such the transport system can utilize such individual models to, for example, manage routing for SDVs through such traffic pockets or areas (e.g., selecting lanes or alternative routes to bypass the traffic area). Furthermore, the transport system 100 can provide ETA data 142 for users of the transport service via the designated application 185. For example, prior to transmitting a pick-up request 197, the users can be provided with improved ETA data 142 for a number of vehicles proximate to the user's current location or a potential pick-up location.

In many implementations, the transport system 100 can receive pick-up requests 197 from user of the transportation service (430). As described, the pick-up requests 197 can include a pick-up location. For each pick-up request 197, the transport system 100 can utilize the traffic model(s) 132 to select an optimal SDV 109 to service the pick-up request 197 (435). For example, the transport system 100 can identify a pool of proximate SDVs in relation to the pick-up location (440). In one aspect, the transport system 100 can only identify available SDVs, such as those that are not currently transporting a user to a destination. In variations, the transport system 100 can identify all available and unavailable SDVs proximate to the pick-up location.

For the unavailable SDVs, the transport system 100 can determine a first ETA to a drop-off destination, account for an averaged drop-off time delta (e.g., ten or fifteen seconds)—changing the status of the SDV from unavailable to available—and determine a second ETA for the SDV to arrive at the pick-up location (442). Thus, the transport system 100 can estimate the overall time for such unavailable SDVs to arrive at the pick-up location based on the constructed traffic models 132. Using these overall time estimates for the unavailable SDVs, and the normal ETAs using the traffic models for the available SDVs (444), the transport system 100 can select an optimal SDV 109 from the proximate pool of SDVs to service the pick-up request (435). Thus, in certain situations, the optimal SDV 109 selected by the transport system 100 may be unavailable at the time of selection, but still determined to arrive at the pick-up location prior to any other proximate SDVs in the pool based on the constructed traffic models 132.

In certain aspects, the transport system 100 can transmit ETA data 142 to the requesting user corresponding to the selected SDV 109 (445). For example, while the user is awaiting pick-up, the transport system 100 can provide the requesting user with ETA data 142 for when the selected SDV 109 is to rendezvous with the requesting user (447). This ETA data 142 can include the calculated overall time if the SDV 109 first needs to make a drop-off. Furthermore, once the SDV 109 has rendezvoused with the requesting user, the transport system 100 can provide the user with ETA data 142 corresponding to an arrival time to the destination (449). Still further, the transport system 100 can utilize the traffic models to provide the SDV with routing information or updates 184 during the trip (450). Such routing information or updates 184 can enable or cause the SDV 109 to perform mid-level actions such as selecting a lane, bypassing traffic pockets by using a detour or alternative route, and the like. Furthermore, the transport system 100 can provide such routing updates 184 to the SDV 109 throughout the course of the whole trip, generating such updates 184 can transmitting them to the SDV 109 dynamically, or whenever an upcoming traffic pocket or area is identified in the constructed traffic models 132 along the SDV's 109 route (455).

In certain implementations, the transport system 100 can identify stale data in the dynamically constructed traffic models 132 (460). For example, the transport system 100 can determine that SDVs have not driven through a certain area in the given region for a certain amount of time (e.g., five or ten minutes), which can indicate that the traffic model for that area is unreliable. In accordance with certain examples, the transport system 100 can transmit transport directive 182 to SDVs in the fleet that are proximate to such areas in order to provide refreshed SDV data 194 (465). Such transport directives 182 can cause SDVs to be rerouted from current routes, or can utilize available SDVs that are on standby to provide the refresh SDV data 194. Accordingly, as the SDV data 194 is received, the transport system 100 can dynamically update the constructed traffic models 132 (470).

Hardware Diagrams

Figure 5:
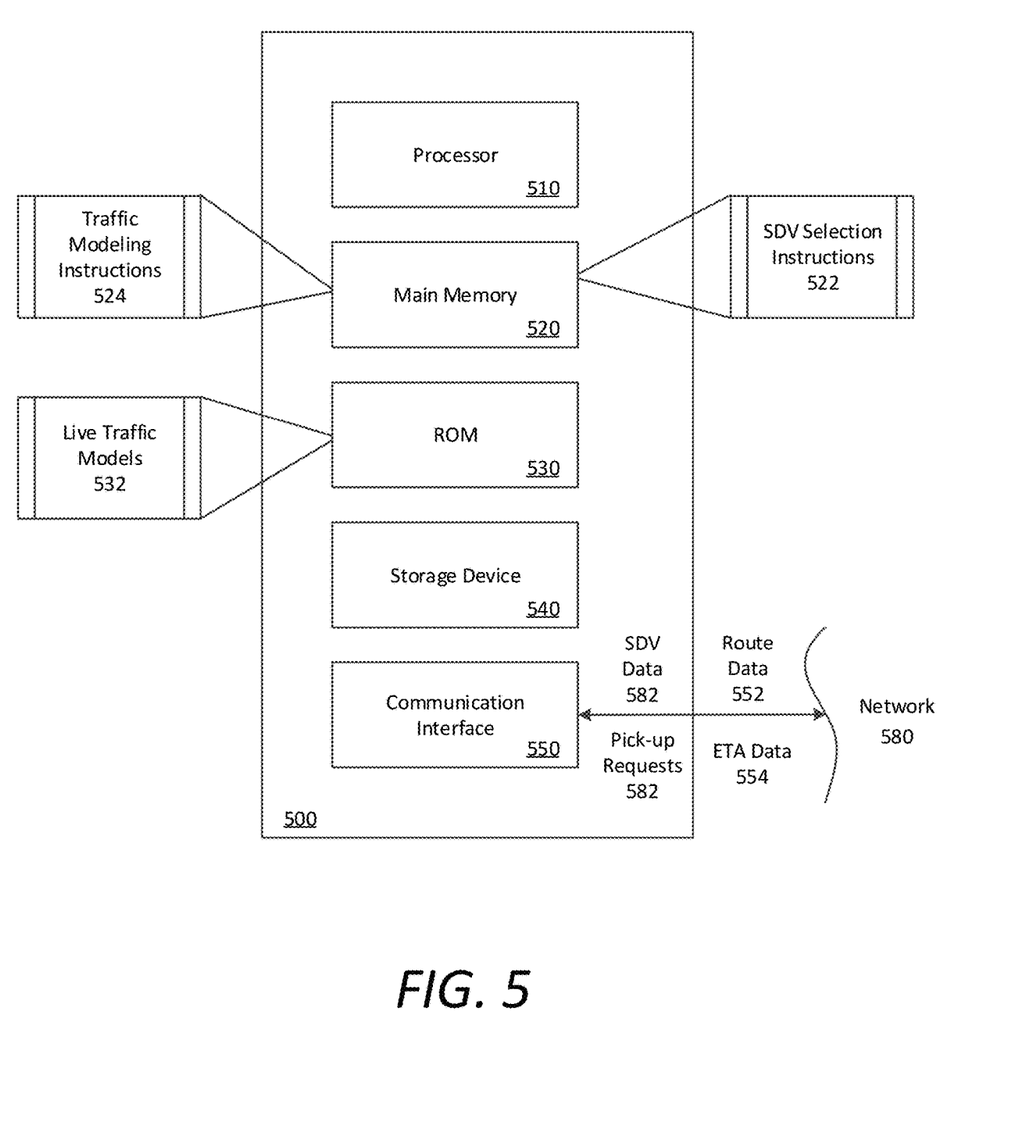
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services. In the context of FIG. 1, the transport system 100 may be implemented using a computer system 500 such as described by FIG. 5. The transport system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, one or more servers, driver devices, and/or a fleet of SDVs 190. In accordance with examples, the computer system 500 receives pick-up requests 584 from mobile computing devices of individual users. The executable instructions stored in the memory 530 can include traffic modeling instructions 524, which the processor 510 can execute to construct live traffic models 532 for the given region. The communication interface 550 can receive SDV data 582, comprising lane-specific and granular positioning and speed information from the fleet of SDVs. The processor 510 can utilize the SDV data 582 to dynamically construct the live traffic models 532, as described herein.

The main memory 520 can also store SDV selection instructions 522, which the processor 510 executes to perform an optimization operation to identify a most optimal vehicle to service a pick-up request 584. In performing the optimization, the processor 510 can receive SDV data 582 corresponding to SDVs proximate to the pick-up location indicated in the pick-up request 584, account for estimated drop-off time deltas for unavailable proximate SDVs, and utilize the constructed traffic models 532 to determine a most optimal SDV with a shortest ETA to the pick-up location.

The processor 510 is configured with software and/or other logic to perform one or more processes, steps and other functions described with implementations, such as described by FIGS. 1 through 6, and elsewhere in the present application.

Figure 6:
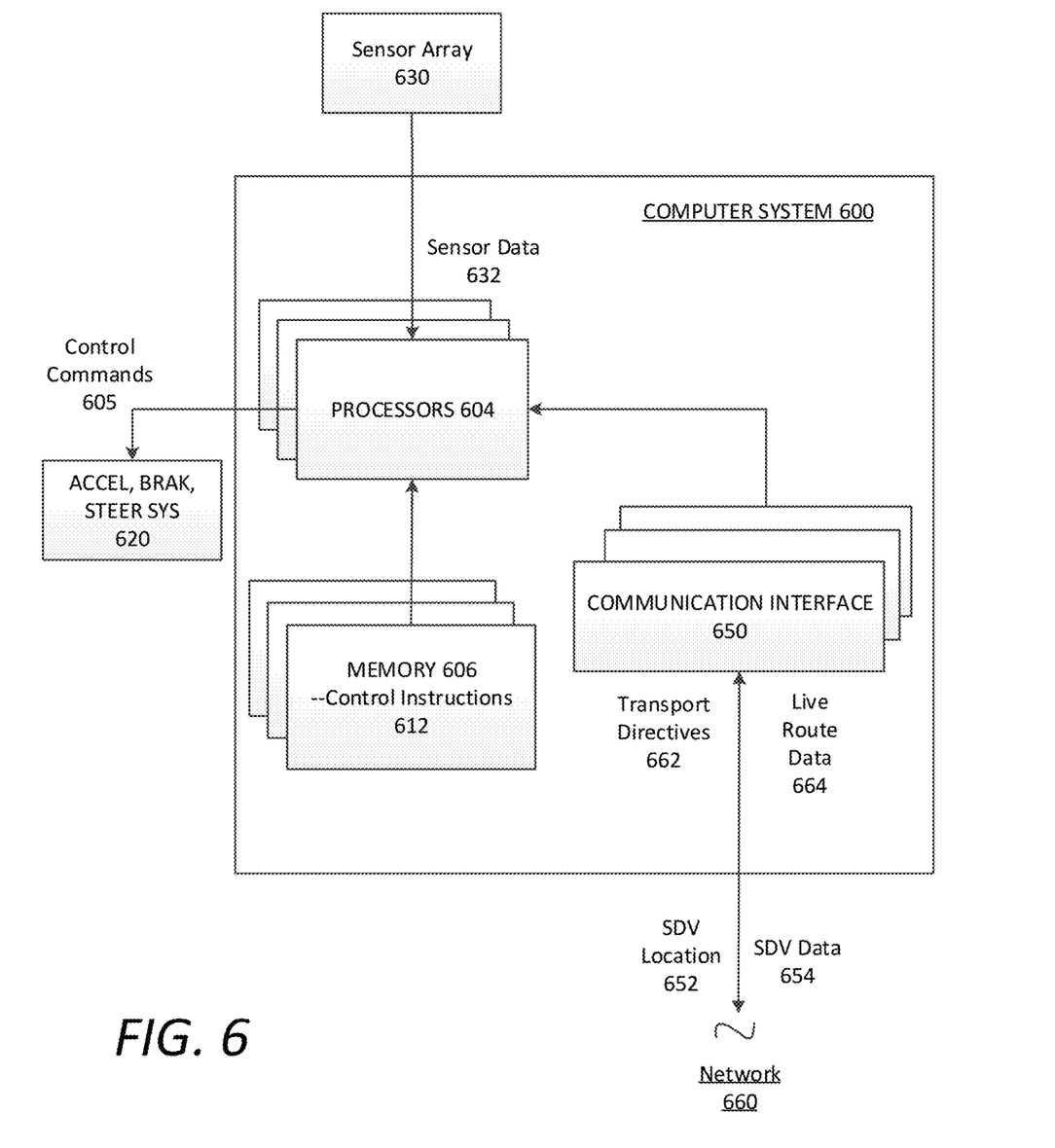
FIG. 6 is a block diagram illustrating a computing system for an AV or SDV upon which examples described herein may be implemented.

FIG. 6 is a block diagram illustrating a computer system upon which example SDV processing systems described herein may be implemented. The computer system 600 can be implemented using one or more processors 604, and one or more memory resources 606. In the context of FIG. 2, the control system 220 can be implemented using one or more components of the computer system 600 shown in FIG. 6.

According to some examples, the computer system 600 may be implemented within an autonomous vehicle or self-driving vehicle with software and hardware resources such as described with examples of FIG. 2. In an example shown, the computer system 600 can be distributed spatially into various regions of the SDV, with various aspects integrated with other components of the SDV itself. For example, the processors 604 and/or memory resources 606 can be provided in the trunk of the SDV. The various processing resources 604 of the computer system 600 can also execute control instructions 612 using microprocessors or integrated circuits. In some examples, the control instructions 612 can be executed by the processing resources 604 or using field-programmable gate arrays (FPGAs).

In an example of FIG. 6, the computer system 600 can include a communication interface 650 that can enable communications over one or more networks 660 with a backend transport system, such as those examples described with respect to FIG. 1. In one implementation, the communication interface 650 can also provide a data bus or other local links to electro-mechanical interfaces of the vehicle, such as wireless or wired links to and from the SDV control system 220, and can provide a network link to a transport system over one or more networks 660.

The memory resources 606 can include, for example, main memory, a read-only memory (ROM), storage device, and cache resources. The main memory of memory resources 606 can include random access memory (RAM) or other dynamic storage device, for storing information and instructions which are executable by the processors 604. The processors 604 can execute instructions for processing information stored with the main memory of the memory resources 606. The main memory 606 can also store temporary variables or other intermediate information which can be used during execution of instructions by one or more of the processors 604. The memory resources 606 can also include ROM or other static storage device for storing static information and instructions for one or more of the processors 604. The memory resources 606 can also include other forms of memory devices and components, such as a magnetic disk or optical disk, for purpose of storing information and instructions for use by one or more of the processors 604.

According to some examples, the memory 606 may store a set of software instructions including, for example, control instructions 612. The control instructions 612 may be executed by one or more of the processors 604 in order to implement functionality such as described with respect to the SDVs herein. The computer system 600 can communicate, periodically or continuously, SDV location data 652 and/or SDV data 654—which can include positioning, speed, direction, and/or sensor view data—to the transport system over the network 660. As described herein, the transport system can construct granular traffic models for the given region through which the SDV operates.

In certain examples, the computer system 600 can receive transport directives 662 via the communication interface 650 and network 660 from a transport system. As described herein, the transport directives 662 can include a request to provide transportation for a requesting user, and can include data corresponding to a pick-up location. In executing the control instructions 612, the processing resources 604 can identify the pick-up location and destination (after pick-up), and generate control commands 605 to autonomously operate the acceleration, braking, and steering systems 620 of the SDV. In operating the acceleration, braking, and steering system 620, the processors 604 can process sensor data 632 from the sensor array 630 of the SDV to continuously analyze the surrounding environment in order to avoid any potential hazards.

Furthermore, the processors 604 operate the acceleration, braking, and steering systems 620 along a current route, either determined locally via a mapping resource, or via information from a remote source. In one aspect, the communications interface 650 can receive live route data 664 from the transport system over the network processors 604 can While examples of FIGS. 3, 5, and 6 provide for computing systems for implementing aspects described, some or all of the functionality described with respect to one computing system of FIGS. 3, 5, and 6 may be performed by one or more other computing systems described with respect to FIGS. 3, 5, and 6.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A transport system comprising:
   a network communication interface communicating, over one or more networks, with (i) a fleet of self-driving vehicles (SDVs) operating throughout a given region, and (ii) computing devices of users of a transportation arrangement service in the given region;
   one or more processors; and
   one or more memory resources storing instructions that, when executed by the one or more processors, cause the transport system to:
   receive, over the one or more networks, vehicle data from each respective SDV in the fleet of SDVs, the vehicle data comprising sensor view data indicating a surrounding environment of the respective SDV that includes a current lane of the respective SDV and additional lanes in the surrounding environment of the respective SDV;

determine, from the vehicle data, a set of properties of one or more other vehicles external to each SDV in the fleet;

based on the set of properties of the one or more other vehicles external to each SDV in the fleet, generate one or more traffic models for the given region to indicate traffic flow in the current lane of each respective SDV in the fleet of SDVs and traffic flows in the additional lanes in the surrounding environment of each respective SDV in the fleet of SDVs; and utilizing the one or more traffic models, provide, over the one or more networks, estimated time of arrival (ETA) data, corresponding to one or more SDVs in the fleet, to one or more of the computing devices of one or more of the users of the transportation arrangement service.

2. The transport system of claim 1, wherein the vehicle data further comprises speed data for the respective SDV.

3. The transport system of claim 1, wherein the executed instructions further cause the transport system to generate the one or more traffic models by calculating timing data for individual traffic signals throughout the given region based on the traffic flow in the current lane of the respective SDV and traffic flows in the additional lanes in the surrounding environment of the respective SDV.

4. The transport system of claim 3, wherein the calculated timing data corresponds to variable traffic signals in the given region.

5. The transport system of claim 1, wherein the vehicle data comprises location data from each SDV in the fleet of SDVs, and wherein the executed instructions cause the transport system to provide the ETA data to the computing devices of the users via an executing rider application on the computing devices of the users.

6. The transport system of claim 5, wherein the executing rider application enables the users to (i) input a location on an interactive map, and (ii) view ETA data for one or more proximate SDVs in the fleet in relation to the inputted location, the ETA data for the one or more proximate SDVs being based on the one or more traffic models.

7. The transport system of claim 6, wherein the executed instructions further cause the transport system to:

receive, over the one or more networks, a pick-up request from the computing device of a requesting user of the users, the pick-up request corresponding to an inputted pick-up location on the interactive map;

select an SDV, from the one or more proximate SDVs in relation to the inputted pick-up location, to service the pick-up request; and transmit, over the one or more networks, confirmation information to the computing device of the requesting user, the confirmation information identifying the selected SDV and ETA data corresponding to the selected SDV arriving at the inputted pick-up location, the ETA data corresponding to the selected SDV arriving at the inputted pick-up location being based on the one or more traffic models.

8. The transport system of claim 1, wherein the executed instructions further cause the transport system to:

transmit, over the one or more networks, lane specific routing updates to each respective SDV in the fleet, the lane specific routing updates indicating an optimal path for the respective SDV through traffic based on the one or more traffic models.

9. The transport system of claim 8, wherein the executed instructions cause the transport system to dynamically determine the lane specific routing updates for the respective SDV as the respective SDV travels to a given destination.

10. The transport system of claim 1, wherein the fleet of SDVs comprises on the order of thousands, tens of thousands, or hundreds of thousands of SDVs operating throughout the given region.

11. The transport system of claim 1, wherein the executed instructions further cause the transport system to:

coordinate the transportation arrangement service utilizing the fleet of SDVs to service pick-up requests received, over the one or more networks, from the computing devices of any of the users in the given region.

12. The transport system of claim 1, wherein the executed instructions further cause the transport system to:

receive, over the one or more networks, a pick-up request from the computing device of a requesting user of the users, the pick-up request indicating a specified pick-up location for the requesting user;

based on the specified pick-up location, determine a pool of proximate SDVs in relation to the specified pick-up location, the pool of proximate SDVs comprising a number of proximate available SDVs that are not currently servicing another pick-up request, and a number of proximate unavailable SDVs that are each currently servicing another pick-up request; and utilize the one or more traffic models to select, from the pool of proximate SDVs, an optimal SDV to service the pick-up request for the requesting user.

13. The transport system of claim 12, wherein the executed instructions cause the transport system to select the optimal SDV by utilizing the one or more traffic models to determine that the optimal SDV has a lowest ETA to the specified pick-up location.

14. The transport system of claim 13, wherein the executed instructions cause the transport system to utilize the one or more traffic models to calculate an overall arrival time for each of the unavailable proximate SDVs in the pool, the overall arrival time accounting for a first ETA to make a current drop-off at a drop-off location, an estimated drop-off time for the current drop-off, and a second ETA to travel from the drop-off location to the specified pick-up location.

15. The transport system of claim 1, wherein the executed instructions further cause the transport system to:

identify stale vehicle data in the one or more traffic models, the stale vehicle data corresponding to a particular area in the given region;

in response to identifying the stale vehicle data, transmit, over the one or more networks, one or more transport directives to at least one SDV in the fleet to drive through the particular area to provide refreshed vehicle data; and update the one or more traffic models for the particular area using the refreshed vehicle data.

16. A computer-implemented method for traffic modeling, the method being performed by one or more processors and comprising:

communicate, over one or more networks, with (i) a fleet of self-driving vehicles (SDVs) operating throughout a given region, and (ii) computing devices of users of a transportation arrangement service in the given region;

receiving, over the one or more networks, vehicle data from each respective SDV in the fleet of SDVs, the vehicle data comprising sensor view data indicating a surrounding environment of the respective SDV that includes a current lane of the respective SDV and additional lanes in the surrounding environment of the respective SDV;

determining, from the vehicle data, a set of properties of one or more other vehicles external to each SDV in the fleet;

based on the set of properties of the one or more other vehicles external to each SDV in the fleet, generating one or more traffic models for the given region to indicate traffic flow in the current lane of each respective SDV in the fleet of SDVS and traffic flows in the additional lanes in the surrounding environment of each respective SDV in the fleet of SDVs; and utilizing the one or more traffic models, providing, over the one or more networks, estimated time of arrival (ETA) data, corresponding to one or more SDVs in the fleet, to one or more of the computing devices of one or more of the users of the transportation arrangement service.

17. A non-transitory computer-readable medium storing instructions that, when executed by one or more processors, cause the one or more processors to:

communicate, over one or more networks, with (i) a fleet of self-driving vehicles (SDVs) operating throughout a given region, and (ii) computing devices of users of a transportation arrangement service in the given region;

receive, over the one or more networks, vehicle data from each respective SDV in the fleet of SDVs, the vehicle data comprising sensor view data indicating a surrounding environment of the respective SDV that includes a current lane of the respective SDV and additional lanes in the surrounding environment of the respective SDV;

determine, from the vehicle data, a set of properties of one or more other vehicles external to each SDV in the fleet;

based on the set of properties of the one or more other vehicles external to each SDV in the fleet, generate one or more traffic models for the given region to indicate traffic flow in the current lane of each respective SDV in the fleet of SDVs and traffic flows in the additional lanes in the surrounding environment of each respective SDV in the fleet of SDVs; and utilizing the one or more traffic models, provide, over the one or more networks, estimated time of arrival (ETA) data, corresponding to one or more SDVs in the fleet, to one or more of the computing devices of one or more of the users of the transportation arrangement service.

* * * * *